(12) United States Patent
Messina et al.

(10) Patent No.: US 8,458,871 B2
(45) Date of Patent: Jun. 11, 2013

(54) SECONDARY POSITIONING DEVICE FOR WORKPIECE MACHINING

(75) Inventors: Damiano A. Messina, Taylors Lakes (AU); Zuozhang Li, Altona Meadows (AU); Quan Wang, Reservoir (AU); Mark Riddell, Ascot Vale (AU)

(73) Assignee: HG-Farley Laserlab Co. Pty Ltd, Brooklyn, Victoria (AU)

( * ) Notice: Subject to any disclaimer, the term of this patent is extended or adjusted under 35 U.S.C. 154(b) by 995 days.

(21) Appl. No.: 12/456,723

(22) Filed: Jun. 22, 2009

(65) Prior Publication Data
US 2010/0031487 A1    Feb. 11, 2010

(30) Foreign Application Priority Data

Jun. 26, 2008    (AU) ................................ 2008903248

(51) Int. Cl.
*B23P 23/00*    (2006.01)
*B23C 1/06*    (2006.01)
*B23B 47/02*    (2006.01)

(52) U.S. Cl.
USPC .............. 29/26 A; 408/95; 408/234; 408/131; 409/212; 409/190

(58) Field of Classification Search
USPC ............... 29/26 R, 26 A, 34 B; 409/202, 212, 409/235, 178–179, 190, 131–132; 408/95, 408/234, 51; 219/121.67–121.69; 451/360, 451/361, 363, 178
See application file for complete search history.

(56) References Cited

U.S. PATENT DOCUMENTS

| | | | | | |
|---|---|---|---|---|---|
| 3,617,141 | A | * | 11/1971 | Sullivan | ........................ 408/95 |
| 4,865,494 | A | * | 9/1989 | Gudow | .......................... 408/95 |
| 5,123,789 | A | * | 6/1992 | Ohtani et al. | ................... 408/95 |
| 5,157,822 | A | | 10/1992 | Farley | |
| 7,128,506 | B2 | * | 10/2006 | Ferrari et al. | ................. 409/201 |
| 7,137,760 | B2 | * | 11/2006 | Boyl-Davis et al. | .......... 409/178 |
| 7,252,462 | B2 | * | 8/2007 | Suzuki et al. | ................... 408/95 |

(Continued)

FOREIGN PATENT DOCUMENTS

| | | |
|---|---|---|
| AU | 2008903248 | 6/2008 |
| DE | 88 14 093 | 3/1989 |
| EP | 0 738 556 | 10/1996 |

*Primary Examiner* — Erica E Cadugan
(74) *Attorney, Agent, or Firm* — TraskBritt (57) ABSTRACT

A large machining apparatus for working a substantially planar workpiece such as a metal plate in relation to which a set of work actions, such as machining grooves and holes, is required at one of a number of work zones on or in the workpiece, the apparatus including: a working assembly such as a drop down drill movably mounted on a beam for reciprocal linear movement along a first horizontal axis extending parallel to the longitudinal axis of the workpiece; and an assembly rail movably mounted on the beam at right angles to the beam to carry the working assembly. The apparatus further includes: an immobilizing base mounted on the rail for reciprocal linear movement along the assembly rail in the direction of a second axis and a clamping base mounted on the immobilizing base and adapted to be clamped onto the workpiece to locate the working assembly at a predetermined one of said work zones; and a movable base mounted on the assembly rail for limited reciprocal linear displacement along the assembly rail in the direction of the second axis relative to the immobilizing base. The working assembly is mounted on the movable base to enable limited linear displacement of the working assembly in the second axis direction in the predetermined work zone.

10 Claims, 6 Drawing Sheets

U.S. PATENT DOCUMENTS

| | | |
|---|---|---|
| 7,625,158 B2 * | 12/2009 | Forlong ............... 219/121.58 |
| 2003/0222065 A1 | 12/2003 | Leibinger et al. |
| 2004/0025761 A1 | 2/2004 | Sartorio |
| 2004/0202517 A1 | 10/2004 | Kowmowski |
| 2007/0012151 A1 | 1/2007 | Yost, Jr. |
| 2007/0040527 A1 | 2/2007 | Cardinale et al. |
| 2008/0075545 A1 | 3/2008 | Forlong |

* cited by examiner

SECONDARY POSITIONING DEVICE FOR WORKPIECE MACHINING

CROSS-REFERENCE TO RELATED APPLICATION

This application claims priority to Australian Patent Application Serial No. AU 2008903248, filed Jun. 26, 2008, for "Secondary Positioning Device for Workpiece Machining."

FIELD OF INVENTION

This invention relates to improvements in metal plate working machines. More particularly, this invention relates to a machine capable of performing cutting and machining operations over a single plate supporting structure.

BACKGROUND ART

The following references to, and descriptions of, prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

Most metal plate working involves both cutting by means of a guillotine or by means of a profile cutter utilizing plasma arc, oxy-fuel, waterjet, or laser, and subsequent machining. Many plate working operations also require line marking for subsequent bending and welding operations.

At the present time, the above functions are performed by means of either separate and distinct machines whereby the metal plate being worked must be transported from one machine to another or specialized plate processing machines (such as the Farley Laserlab Fabricator, Atlas and Hercules machines) that can cut and machine plates on a common worktable in a single setup. Specialized plate processing machines offer much higher productivity as much of the labor expended in working metal plates is consumed in transporting and maneuvering the plate in the workshop. Where a plate is very large and heavy (for example, weighing many tons), the moving operation may occupy a considerable amount of time and involve expensive transporting and lifting equipment. Thus, it is not surprising that studies have shown that up to ninety percent of labor expended in preparing a metal plate component is not actually adding value to the plate. In addition, many of the machining machines presently in use have serious limitations on the size of plate that can be accepted for machining and even these machines are extremely expensive.

The specialized plate working machines, however, can be further optimized as currently machining multiple nearby features requires the machine and/or plate to be moved from each feature to the next, even if separated by only a very small distance. If the machine is equipped with a plate clamping device, which is generally required where the plate is subjected to large, plate-moving forces during machining, then this device must be deactivated and reactivated each time that the machine or plate is moved to a new position. This required movement increases processing time and may detract from accuracy.

DISCLOSURE OF THE INVENTION

An object of the present invention is to ameliorate the aforementioned disadvantages of the prior art or to at least provide a useful alternative thereto. A further object of the present invention is to provide a plate working machine by means of which the labor cost associated with the fabrication of metal plate components may be reduced and/or output and accuracy may be substantially improved over the current technology.

Accordingly, in one aspect, there is provided an apparatus for working a substantially planar workpiece in relation to which multiple work actions are required at different work areas on or in the workpiece, the apparatus including: a movable beam supported for controlled travel over one surface of the workpiece facing the assembly along a first axis; a working assembly mounted for movement on the beam along a second axis perpendicular to the first axis; the working assembly movable along a broad displacement vector having components of movement along the first and second axes whereby to locate the working assembly at a predetermined one of the work areas on or in the workpiece; a working device for performing the work actions mounted on the working assembly, wherein, the apparatus further includes immobilizing means to fix the working assembly at the predetermined work area; the working assembly is capable of limited movement on a travel mechanism mounted on the beam in a direction parallel to the second axis; and the working device is movable on an adjustment mechanism in a direction parallel to the first axis so that the working device is locatable in the various positions corresponding to a set of work actions required to be performed in the predetermined work area.

The beam may be in the form of a gantry that straddles the workpiece. The gantry may be configured for controlled reciprocal movement along a linear pathway. The gantry is preferably mounted on spaced parallel rails that extend along opposed sides of a table or frame on which the workpiece may be mounted. The beam may be supported at two or more locations along its length. The beam may be supported at its ends by the pair of rails. The beam may be in the form of a boom. The boom may be linear or curved. The boom is preferably a linear beam. The boom may be supported at one point along its length or at one end. The boom may be rotatable about the one point from which an arm is rotatably cantilevered about an axis parallel with a line perpendicular to the general plane of the workpiece. The working assembly may travel along the arm and the combination of this movement with the rotation of the arm may position the working assembly over any working area of the workpiece.

Accordingly, in another aspect, there is provided an apparatus for working a substantially planar workpiece in relation to which a set of work actions are required, each set of work actions being required at a different work area on or in the workpiece, the apparatus including: a working assembly supported for controlled travel over one surface of the workpiece facing the working assembly; a movable beam along which the working assembly travels, whereby the working assembly is locatable at a predetermined one of the work areas; and a working device for performing the work actions mounted on the working assembly, wherein, the apparatus further includes immobilizing means to fix the working assembly at the predetermined work area; the working assembly is capable of limited movement along the beam on a travel mechanism mounted on the beam; and the working device is reciprocally movable on an adjustment mechanism in a direction across the beam so that the working device is serially locatable in a sequence of positions corresponding to the set of work actions in the predetermined work area.

The immobilizing means may include a clamping means. The clamping means may clamp the workpiece. The clamping means may secure the workpiece by a variety of means.

The clamping means may include opposed clamping members that clamp one or more locations on the periphery of the workpiece to the worktable. Alternatively or in addition, the clamping means may fix the workpiece in a desired position against the worktable by forcing a foot means against the workpiece in abutting relationship. The foot means may be mounted to the working assembly, the beam or some other structure associated, either physically or positionally, with the worktable.

The clamping means may include actuating means to urge the workpiece-engaging portion of the clamping means, such as the foot means, into abutting relationship with the facing surface of the workpiece, preferably proximal to the work area. The actuating means may be mounted on or to the working assembly, the beam or some other structure associated with the worktable. Preferably, the actuating means is mounted on or to the working assembly, so that the clamping force applied thereby is close to the work area.

The clamping means is preferably adapted to ensure that the workpiece does not shift as the working device engages and/or disengages the workpiece. The clamping means preferably applies a clamping force that is larger than the greatest expected force that the working device will apply to a workpiece in performing a set of one or more of the work actions at a particular one of the different work areas.

Each of the work areas is preferably a zone on the workpiece that extends no further that the limits of travel the working device is capable of by the agency of the travel mechanism and the adjustment mechanism.

The immobilizing means may support the working assembly and may include a support that translates along the full length of the beam. However, when the immobilizing means is activated, the working assembly may be fixed adjacent a working area. The immobilizing means may include a passive plate fixable relative to the beam. The working assembly may be movable relative to the passive plate to a limited extent defined by the size of the working area.

The travel mechanism on which the rest of the working assembly is mounted may comprise limited movement means. The limited movement means may be capable of limited movement relative to the immobilizing means support. The limited movement means may include an active plate. The active plate may be capable of limited travel relative to the passive plate. Preferably, the active plate is capable of movement in the same direction as the passive plate along the beam.

The working assembly may include a working device support such as a frame, post or housing within or about which the working device is adapted for adjustable movement relative to the working device support. The adjustment mechanism may comprise track means on which the working device is mounted. The track means may comprise one or more tracks preferably extending parallel to the general plane of the workpiece. The track means preferably extends in a direction transverse to the beam.

In a particularly advantageous form of the invention, the movement of the working assembly along the beam and the travel mechanism may be driven by the same drive means. This eliminates the need for at least one motor and reduces the cost, size and complexity of the apparatus.

The working device may be mounted for controlled reciprocal engagement movement toward and away from the workpiece surface. The working device may be mounted for controlled reciprocal engagement movement along a line normal to the workpiece surface. However, it may be desirable to mount the working device at an angle other than 90 degrees where the working device is required to engage the workpiece at an inclined angle.

The engagement movement of the working device, the beam, the working assembly along the beam, the travel mechanism and the adjustment mechanism are preferably driven by drive means controlled and coordinated by a central processor. The working of the workpiece may be controlled by a pre-programmed routine that may involve the execution of one or more sets of work actions at one or more work areas.

In another aspect, the invention may provide a plate working machine comprising means for supporting a metal plate to be worked in a generally horizontal plane, a pair of rails extending along the sides of the plate supporting means, driven support means engaging the rails for travel therealong, the support means comprising a spaced pair of support beams extending from one rail to the other and joined at either end by cross members, means for supporting a machining means between the support beams, the supporting means being mounted on tracks on the beams, and drive means for moving the machining means along the support beams from one side of the plate supporting means to the other. Additionally, the machining means may itself be mounted on rails between the supporting means in an arrangement that permits it to move in a minimum of one axis or preferably two axes while the support means remain stationary.

Further, the machining means may perform the movement along its axes without the need to disengage and re-engage the clamping means. This may result in a plate processing machine that can process multiple nearby features faster and more accurately than current plate processing machines.

Prior art attempts have been described including a machining means whereby the machining means was able to move along one axis only independent of the supporting means. Movement in the axis perpendicular to the independent axis was achieved by moving the entire machining means along the supporting means in the same manner as its usual movement. To accommodate movement of the machining means in this arrangement, the clamping foot was required to be fitted with rollers oriented in the direction of the movement so that it could move across the plate without the need to be disengaged. However, use of rollers in the clamping foot was determined to be impractical due to the nature of the working environment in such a metal plate working process and, therefore, the current invention eliminates the need for such rollers while still allowing movement of the machining means with the clamping foot engaged.

The machine preferably includes one or more profile cutting means mounted on the supporting means for the machining means and extending over one of the beams and downwardly towards a position adjacent the plate supporting means.

Movement of the support means along the rails and the machining and profiling means along the beams may be achieved by electric motors, each of which may drive a gear box and a single or pair of pinion gears that mesh with racks mounted on at least one of the rails and on at least one of the support beams and on the chassis of the machining means assembly.

In a preferred form of the invention, the plate working machine also includes means for marking the plate to be worked for subsequent bending and/or welding operations.

It will be appreciated from the above that the necessary machining, profile cutting and, if desired, line marking, may be performed on the metal plate to be worked without moving the plate from the plate supporting means. As a result of this arrangement, the plate working operations may be performed far more efficiently with significant reductions in non-productive labor content. The cutting head of the profile cutting means and the machining head of the machining means may be accurately positioned by movement of the driven support means on which the support beams are mounted and/or by the drive means for moving the machining means across the support beams and/or by the drive means for moving the machining head relative to the support beam.

The accurate positioning of the machining means and cutting head, as well as the other operations performed by the machine, are controlled by a computerized numerical control system mounted typically at one end of the front support beam. The control system is programmed to automatically perform all movements and machine operations necessary to process workpieces including metal pieces such as large plates into finished parts. Since the support beams may be relatively long (for example, from two to ten meters, and preferably of the order of four meters) compared to other machining and profiling machines, and the plate supporting means may be of any desired length, but conveniently of the order of 16 meters, plates of substantial dimensions may be accommodated by the machine.

When a metal plate is machined, it is important that the plate be maintained in a stationary position with respect to the metal working means, such as a machining head. At the present time, this is usually achieved by means of pneumatically or hydraulically operated clamping feet, which apply substantial forces to the plate and, therefore, require substantial support structures to ensure that deflection of the plate and the machining support structure during machining, and especially at the point of tool break-through, are minimized, and preferably eliminated in most cases. Accordingly, the actuating means is preferably electrically, pneumatically or hydraulically operated or driven to provide sufficient bearing force on the surface of the workpiece to resist movement thereof when the working device applies maximum kinetic force to the workpiece.

In another aspect of the present invention, there may be provided an improved clamping mechanism for a plate working machine so that deflection of machining means is minimized without necessitating use of substantial support structures for machining means.

Accordingly, there may be provided a clamping mechanism for a plate working machine comprising at least one clamping foot positioned to engage the plate to be worked, means for applying a substantially perpendicular clamping force to the plate to be worked through the foot and means for locking the clamping foot in the clamped position whereby the means applying the clamping force may be deactivated to reduce the loads applied to the structure supporting the clamping foot during plate working operations.

In a preferred form, a single clamping foot that partially surrounds the intended machining portion or selected work area is provided.

In a fourth aspect, the invention may provide a plate working machine comprising means for supporting a metal plate to be worked in a generally horizontal plane, a pair of rails extending along the sides of the plate supporting means, driven support means engaging the rails for travel therealong, the support means comprising a spaced pair of support beams extending from one rail to the other and joined at either end by cross members, means for supporting machining means between the support beams, the supporting means being mounted on tracks on the beams, and drive means for moving the machining means along the support beams from one side of the plate supporting means to the other, a drive system for moving the machining means independent of the support beams and independent of the clamping activity, plate clamping means supported by the supporting means for applying a clamping force to the plate through the clamping means, the force being selected to be larger than the greatest expected machining force, and means for locking the clamping means in its clamped position while the clamping force is applied to the plate.

The forces acting transverse to the plane of the plate may be vertical forces where the plate lies in a horizontal plane. However, the plate may be advantageously mounted on an inclination or in a vertical plane so that the worktable may be a vertical wall against which the plate may rest or be mounted, such as where space is at a premium or the plate is best supported in a vertical position. Accordingly, discussion of vertical forces herein may be understood, where the plate is oriented other than horizontal, to mean forces normal to the plane of the plate.

It will be appreciated that by locking the clamping means in the plate clamping position, preferably additional vertical forces due to plate working operations will not be added to the total vertical force on the supporting structure, as in prior art arrangements described above, and the total vertical load on the supporting structure is the greater of the forces applied by the plate machining means or the clamping force. Thus, as the clamping force is greater than the machining force, the total vertical load on the support structure will be invariant during plate machining operations, thus ensuring no change in vertical position of the machining means during machining operations. Conventional designs must be much more rigid to reduce vertical movement as the total vertical force changes during machining operation. In the case of the preferred embodiment described in greater detail below, the support beams are designed for loads of about 4 tons rather than loads of about 15 tons, which would be required if a prior art clamping mechanism were to be used.

In another preferred form of the invention, there is provided a clamping plate driven by two servos or otherwise driven leadscrews or hydraulic or pneumatic systems to lock the support means to the workpiece during a machining operation. The clamping forces are localized and maintained around the machine spindle while allowing the spindle to move in a predetermined (typically 250 mm×250 mm) working envelope. The clamp, which is an integral part of the machining structure, ensures that the whole machine structure absorbs and dampens any vibration and twisting associated with the machining, particularly when the tool breaks through the metal.

BRIEF DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention. In the drawings.

DETAILED DESCRIPTION OF THE DRAWINGS

While the preferred embodiment will be described with reference to a metal workpiece, it will be appreciated by the skilled person that the apparatus described will be usefully applicable to workpieces made of other machinable materials.

Figure 1:
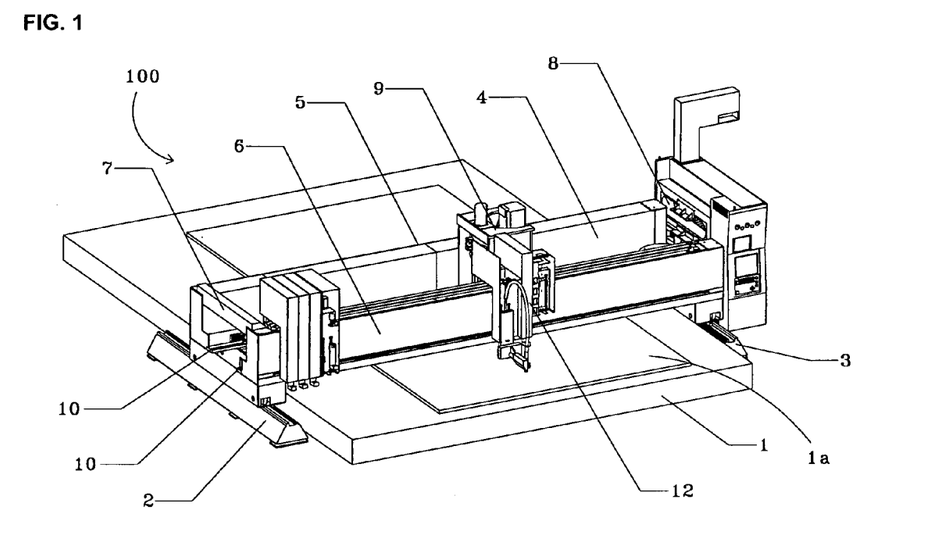
FIG. 1 is a perspective schematic view of a metal working machine according to a preferred embodiment of the invention.
Figure 2:
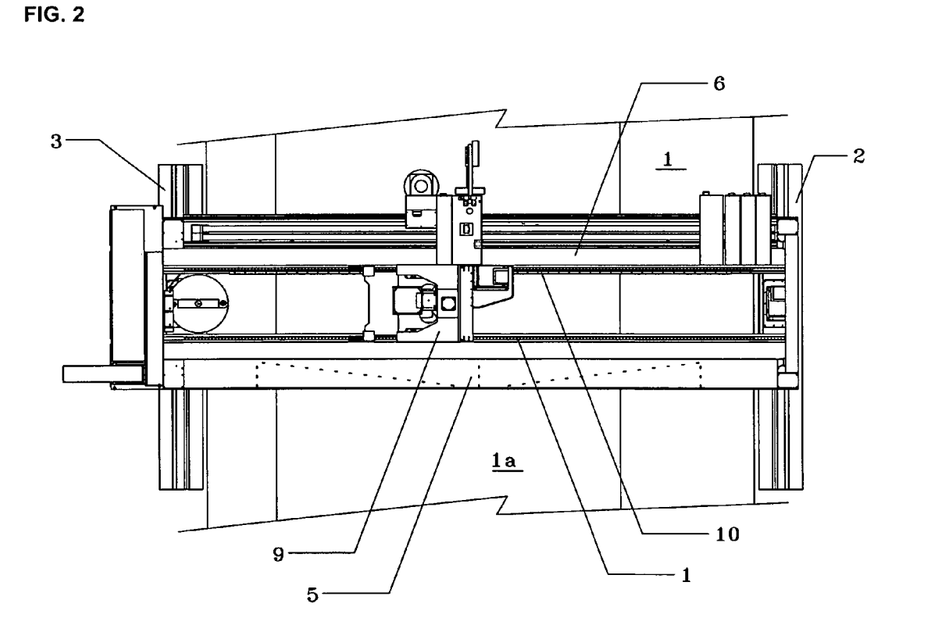
FIG. 2 is a top view of the machine shown in FIG. 1.
Figure 3:
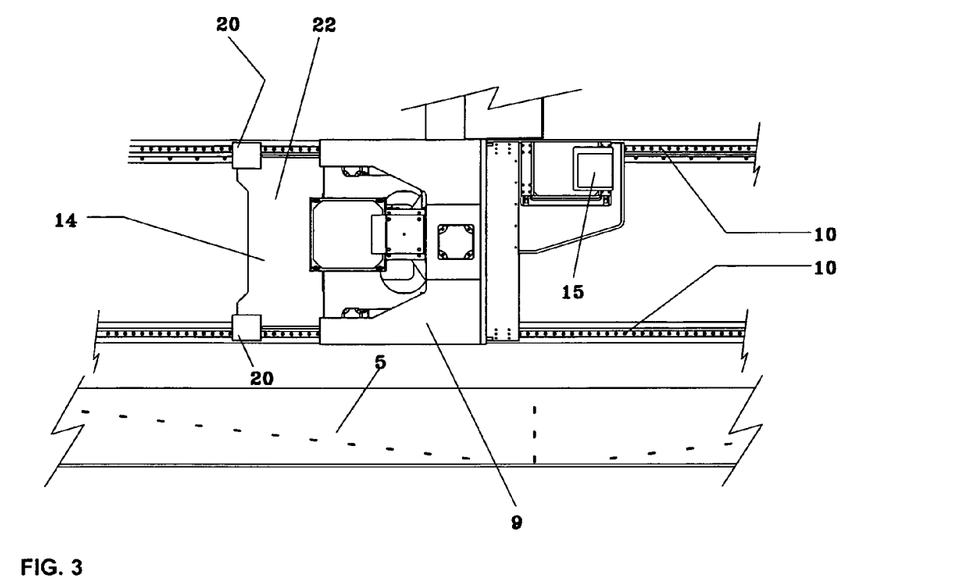
FIG. 3 is a top view of the machining structure and supporting means according to the embodiment shown in FIG. 1.
Figure 4:
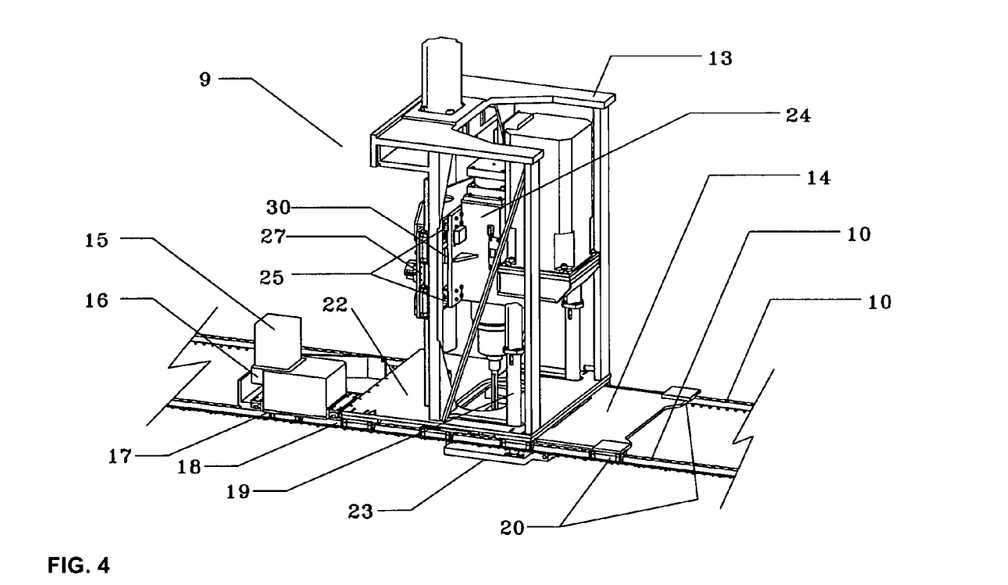
FIG. 4 is a perspective view of the machining structure (with structural covers removed to aid understanding) embodying the invention.
Figure 5:
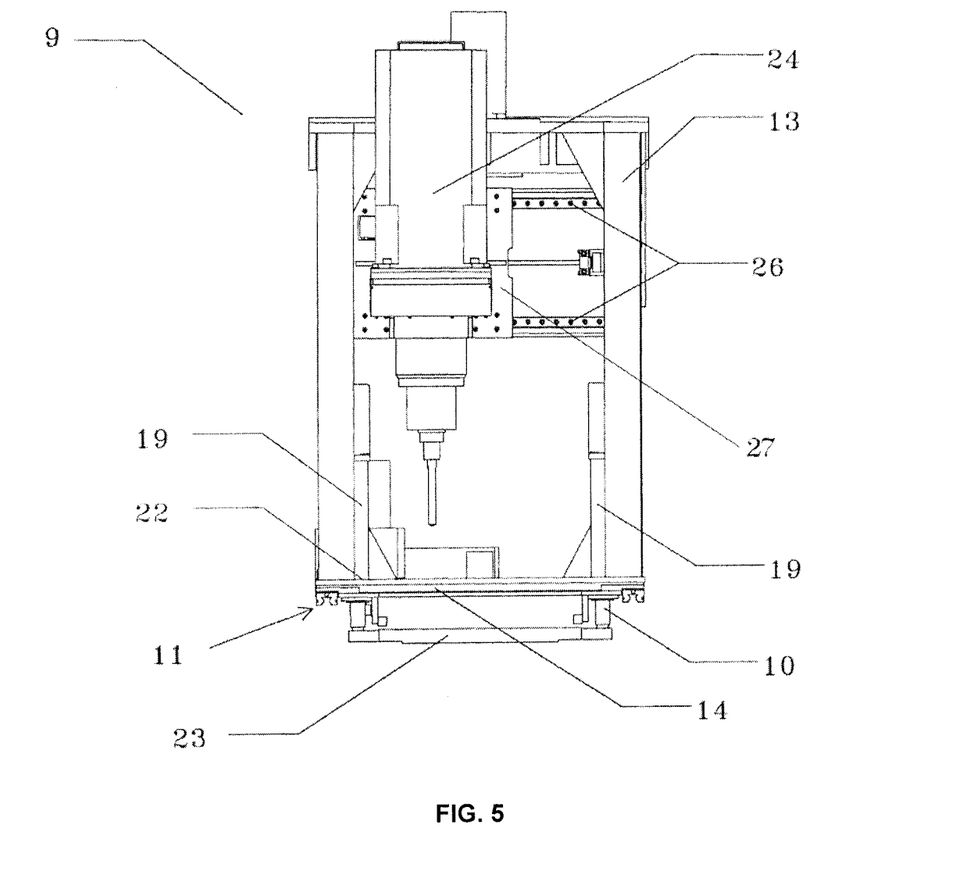
FIG. 5 is a side view of the machining structure (with structural covers removed to aid understanding) embodying the invention.

Referring first to FIGS. 1 through 3, the plate working machine 100 embodying the invention will be seen to comprise a metal plate supporting table 1 including an array of upstanding metal support slats surrounded by an edge frame, a pair of rails 2, 3 extending along the sides of table 1, a driven support means 4 for travel along the rails 2, 3, the support means 4 comprising a spaced pair of support beams 5, 6 extending from one rail 2 or 3 to the other rail 2 or 3 and joined at either end by cross-members 7 and 8. A machining assembly 9 is mounted on linear bearings, rails or tracks 10 (refer further to FIGS. 2 and 3) on the beams 5 and 6, and a high speed oxy/plasma profiling head 12 of known construction is carried by the drilling assembly 9 and extends over the beam 6 and downwardly towards a position adjacent table 1.

Referring now to FIGS. 4, 5, 6A, and 6B of the drawings, the clamping assembly 11 mainly comprises a clamping foot 23 fixed to clamping actuators 19 and a passive base plate 14. The clamping actuators 19 are fixed rigidly to the passive base plate 14, which mounts to the beams 5 and 6, making up the supporting structure 4, via four passive plate bearing blocks 20 fitted to the rails (linear bearings) 10. Since the clamping assembly 11 is fixed to the passive base plate 14, the clamping assembly 11 hence moves together with the passive base plate 14 along the rails 10.

The structurally rigid outer housing 13 of the machining assembly 9 is fixed to an active base plate 22, which is also mounted to the rails 10 via another four active plate bearing blocks 21. The active base plate 22 is propelled along rails 10 via at least one active plate drive means comprising a motor 15, gearbox 16, and pinion 17 engaged with a rack 18. Rack 18 is rigidly mounted to one or more of the beams 5 and 6 making up the supporting structure 4 and the rack 18 engages the pinion 17.

The active base plate 22 and passive base plate 14 share the same rails 10 but move independently of each other over a predetermined distance. At the limits of this independent movement, both plates interact and move together being propelled by at least one active plate drive means comprising the motor 15, gearbox 16, and pinion 17 engaged with rack 18. The arrangement of the machining assembly 9, active base plate 22 and passive base plate 14, rails 10 and clamp assembly 11 permit the independent movement of the machining assembly 9 while the supporting beams 5,6 and activated clamp assembly 11 remain stationary.

The preferred embodiment according to one aspect of the invention can be further enhanced to include a means of controlled relative movement between the active base plate 22 and the passive base plate 14. This means of movement can be provided by hydraulic, electrical or pneumatic systems via mechanical devices or directly.

Referring to FIGS. 6A through 8, to enable movement of a machining spindle structure or drill assembly 24 in the same direction of travel of the movement of the supporting structure 4 along the rails 2 and 3, but independent of the movement of the supporting structure 4, the machining spindle structure 24 is mounted via four spindle mounting blocks 25 to two horizontal spindle supporting rails 26, which are fixed rigidly to spindle mounting plate 27. Motion for the machining spindle structure 24 along rails 26 is provided by a machining assembly orientation motor 28 and drive system 29, which rotates a ballscrew 30, one end of which is fixed to spindle mounting plate 27. The drill assembly 24, complete with active base plate 22, clamp components 19, 23 and passive base plate 14, is moved along the rails 10 by motor 15 during the normal machining process and when fast travelling to a machining location on the workpiece 1a. Once at a machining location, the clamp 11 activates and locks the passive base plate 14 to the beams 5, 6 so that neither the passive base plate 14 nor the beam 5, 6 can move. However, the active base plate 22, and therefore the drill assembly 24, can still move under motion of the same active plate motor 15, so motion is achieved in both the x and y directions in the chosen temporary machining location. The need for an extra drive system is obviated as only orientation motor 28 and active plate motor 15 are required for varying the location of the spindle structure 24 in the chosen machining location. The active plate motor 15 serves a dual function of (1) moving the entire machining assembly 9 along rails 10 when fast travelling to a machining location on the workpiece 1a and (2) moving the active base plate 22 and drill assembly 24 when the passive base plate 14 is clamped to the beam 5, 6, so that active plate motor 15 is "reused," so to speak.

Figure 6A:
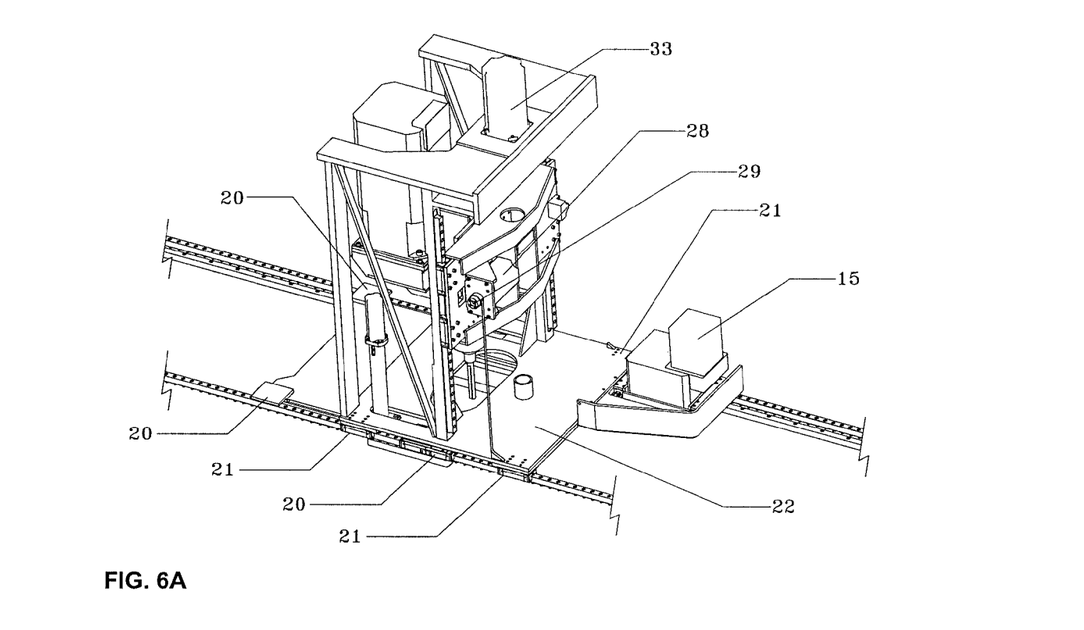
FIGS. 6A and 6B are perspective views of the machining structure (with structural covers removed to aid understanding) embodying the invention.
Figure 6B:
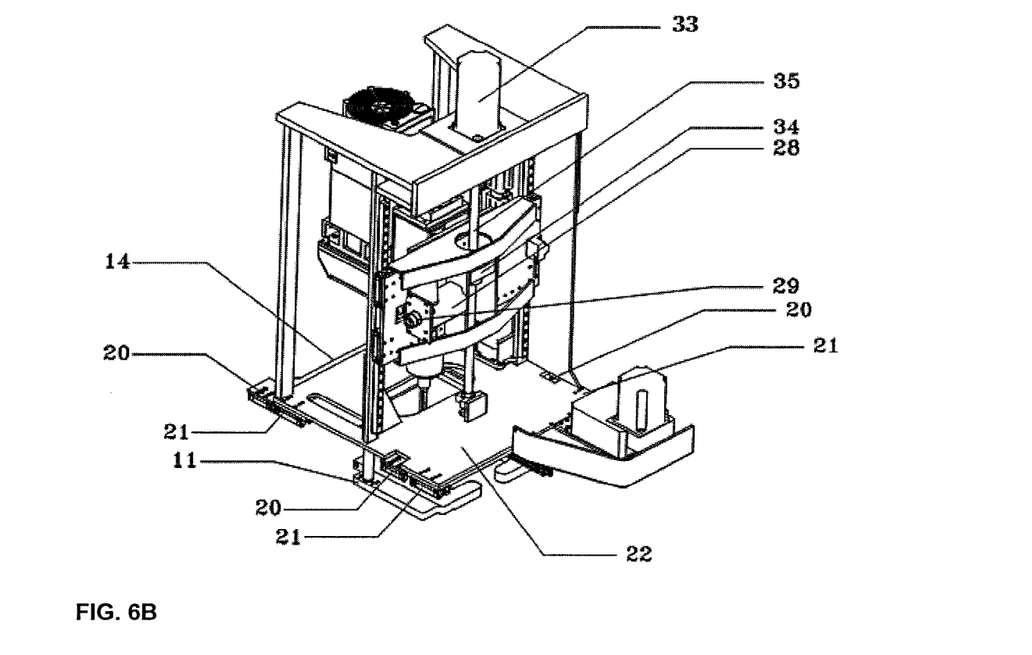
Figure 7:
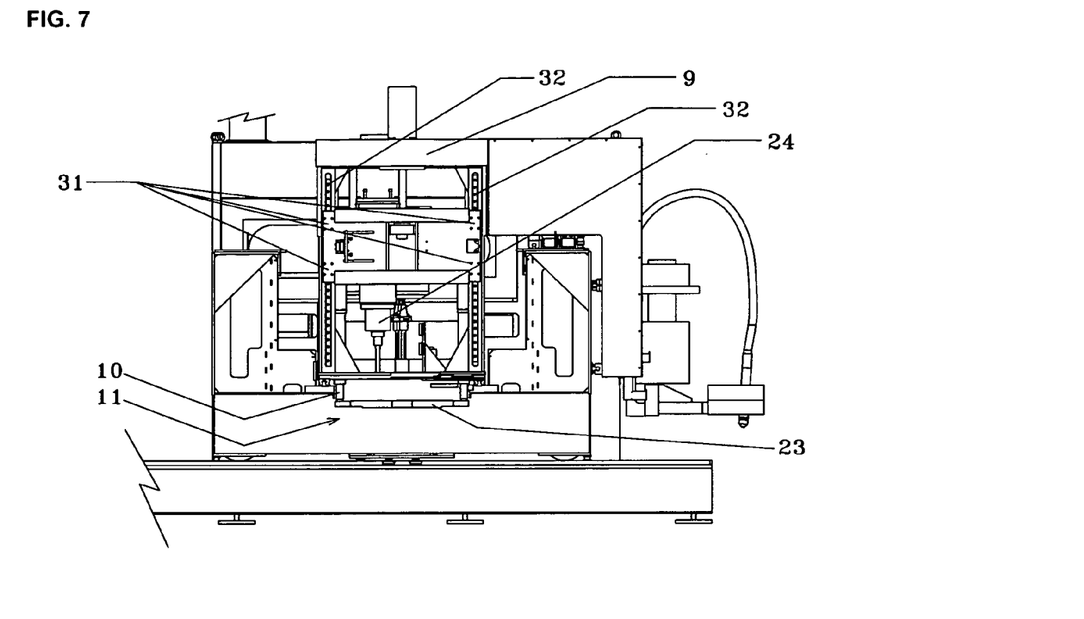
FIG. 7 is a sectional side view of the machine embodying the invention.

Referring to FIGS. 6A, 6B and 7, the machining spindle structure 24 can be moved vertically independent of any other structure and independent of any other movement of any other structure. To provide this vertical movement of the machining spindle structure 24, the spindle mounting plate 27 is mounted to the machining assembly 9 via four vertical movement spindle mounting blocks 31 to two vertical rails 32, which are rigidly fixed to machining assembly 9. The vertical movement of the machining spindle structure 24 brings the installed machining tool into contact with the workpiece to accomplish the desired machining process. A top plan view of this arrangement is shown in FIG. 8.

Figure 8:
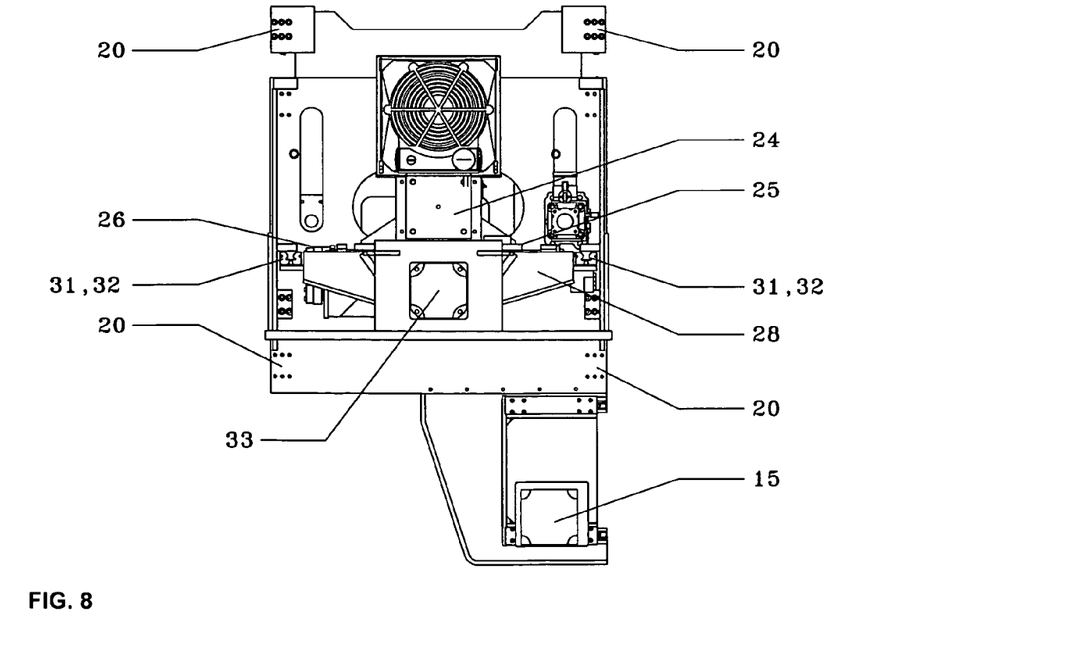
FIG. 8 is a schematic top plan view of the mounting of the machining assembly.
Figure 9:
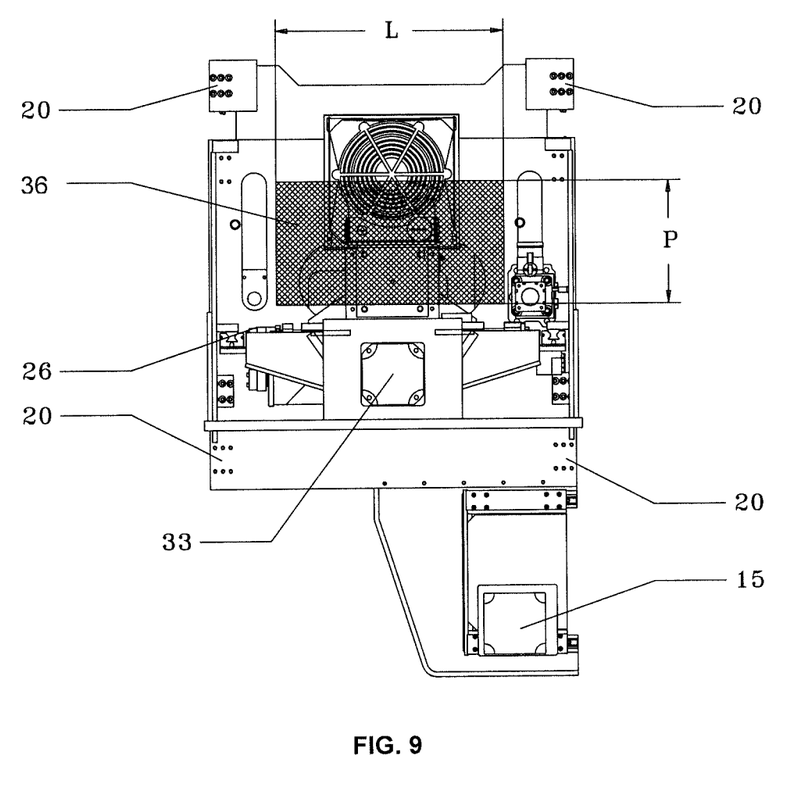
FIG. 9 is a schematic top plan view of the machining assembly over a portion of a workpiece showing an envelope area to be worked when the assembly is in a fixed position.

In FIGS. 7 through 9, a typical processing envelope or local work area 36 defined by the extent of local movement that is possible by the machining spindle structure 24 is shown in gray shade. The envelope 36 is defined by the lateral extent L to which the spindle mounting plate 27 is able to travel on the rails 26 transverse to the longitudinal axes of the rails 10 and the longitudinal extent of travel P of the active base plate 22 in a direction parallel to the rails 10.

Vertical motion for the machining spindle structure 24 is provided by and controlled by vertical motion motor 33, drive system 34 and ballscrew 35, one end of which is fixed to machining spindle structure 24.

When activated, the clamp foot 23 moves downward to contact the workpiece 1a, clamping the workpiece 1a firmly to the worktable 1. The clamp foot 23 motion is provided by the operation of at least one motor or cylinder of actuator 19. The clamping force is transmitted into the supporting structure 4 and is limited via the machine controller (CNC) to a maximum force as described previously herein.

The invention permits the machining spindle structure 24 to move in any horizontal direction within a predetermined envelope or footprint defined by the extent of travel permitted by rails 26 when the machining assembly 9 is clamped in a fixed position by the activation of the clamp foot 23, thereby clamping the workpiece to the work table. The invention further permits the machining spindle structure 24 to move vertically with or without activation of the clamp foot 23 and independent of movement of any other structure.

Accordingly, preferably the invention comprises an apparatus 100 for working a substantially planar workpiece 1a in relation to which a set of work actions is required at one of a number of work zones on or in the workpiece 1a, the apparatus 100 including: a working assembly 9 movably mounted on a beam 2, 3 for reciprocal linear movement along a first axis; and an assembly rail 10 movably mounted on the beam 2, 3 at right angles to the beam 2, 3, wherein the apparatus 100 further includes: an immobilizing base 14 mounted on the rail 10 for reciprocal linear movement along the assembly rail 10 in the direction of a second axis; a clamping base 23 mounted on the immobilizing base 14 and adapted to be clamped onto the workpiece 1a to locate the working assembly 9 at a predetermined one of the work zones; and a movable base 22 mounted on the assembly rail 10 for limited reciprocal linear displacement along the assembly rail 10 in the direction of the second axis relative to the immobilizing base 14, the working assembly 9 mounted on the movable base 22 to enable limited linear displacement of the working assembly 9 in the second axis direction in the predetermined work zone.

The working assembly 9 may comprise a machining tool 24 movably mounted to a tool rail 26 for reciprocal linear movement along the tool rail 26 in the direction of the first axis enabling, together with the movement provided by the movable base 22, minor adjustments in position of the machining tool 24 anywhere within the predetermined work zone. By the movement of the machining tool 24 on the tool rail 26 and of the movable base 22 on the assembly rail 10, the working assembly 9 may be serially locatable in a sequence of positions corresponding to the set of work actions in the predetermined work area. The tool rail 26 may be mounted for controlled reciprocal movement toward and away from the workpiece 1a surface to perform each work action. The machining tool 24 may be a high speed rotating tool capable of forming a series of recesses or holes in the workpiece 1a that are greater in lateral size than the width of the rotating tool.

The working assembly 9 may include extendable actuators 19 to press the clamping base 14 against the workpiece 1a to lock the workpiece 1a in place.

The movement of the working assembly 9 and the movable base 22 in the direction of the second axis may be driven by a common driver 15, 16, 17. The common driver 15-17 may be mounted to a driven support structure 4 aligned parallel to the assembly rail 10.

The clamping base 14 may apply a clamping force to the workpiece 1a that is larger than the greatest expected force that the working assembly 9 will apply to the workpiece 1a in performing the set of work actions.

The invention may also involve a method of working a workpiece 1a including the steps of: supporting the workpiece 1a in a generally horizontal plane using a first support 1 having side edges; extending a linear support 2, 3 along one of the side edges; engaging a driven support 4 with the linear support 2, 3 for travel along the linear support 2, 3; mounting a movable base 22 for reciprocal travel along the driven support 4; mounting a machining assembly 9 on the movable base 22; mounting an immobilizing base 14 on the driven support 4 for reciprocal linear movement along the driven support 4 in the direction of a second axis; mounting a clamping base 23 under the immobilizing base 14 for travel along the driven support 4 relative to the side edge; clamping the workpiece 1a against movement during work carried out using the machining assembly 9 with the clamping base 23; moving the movable base 22 independent of the immobilizing base 14; and moving the machining assembly 9 while the clamping base 23 is activated and applying the clamping force to the workpiece 1a.

The principle of operation is as follows:
1. A program is loaded into the machine controller (CNC).
2. Upon start of program, the CNC directs the supporting structure 4 to move along the rails 2 and 3 and the machining assembly 9 to move along the supporting structure 4 to a predetermined position over the workpiece 1a. During this movement, the clamping foot 23 is in the disengaged or raised position.
3. Upon reaching the predetermined longitudinal position over the workpiece, the supporting structure 4 stops moving along the rails 2 and 3 and the machining assembly 9 stops moving along the supporting structure 4.
4. The CNC then activates the clamp system 11 and the clamping foot 23 moves down to engage the workpiece 1a until a predetermined force is reached at which time the clamp foot 23 stops moving down and is locked into the predetermined longitudinal position. At this point, the clamp foot 23, supporting structure 4, passive base plate 14, and machining assembly 9 are all stopped and prevented from movement.
5. The CNC then directs the motor 15 to move the machining structure 9 to move along its axis to a predetermined lateral position and then stop. Simultaneously, the CNC directs the motor 28 to move the machining spindle structure 24 along the spindle supporting rails 26 (in a longitudinal direction with reference to the worktable 1) to a predetermined position and stop. The machining spindle structure 24 is now in the correct position to begin machining the first feature in the workpiece.
6. The CNC then directs machining spindle structure 24 to move downward along its axis to a predetermined distance to complete the programmed machining operation. When completed, the machining spindle structure 24 rises away from the workpiece 1a a predetermined distance and repeats step 5 until all machining operations possible within the predetermined envelope are completed. The invention provides that the repeated machining operations are completed without moving the supporting structure 4 nor releasing the clamp foot from the workpiece 1a, hence, processing time is reduced and accuracy is improved.
7. The clamp foot 23 then disengages and rises away from the workpiece 1a a predetermined distance.
8. Once the CNC determines the clamp foot 23 has risen a predetermined distance, the CNC then directs the supporting structure 4 to move to another position and the process begins again from step 2.

NOTES: The number of times the process repeats steps 5 and 6 can be from one time to unlimited.

Advantageously, the one or more clamping actuators 19 may be electrically driven, for example, by a servo drive. This allows for more accurate portioning of the clamping activator through the operation and control of the CNC.

Where referred to herein, means for drilling, milling, counterboring, countersinking, interpolated milling, thread cutting, tapping, routing, and cutting shall be collectively referred to as machining means. Where referred to herein, machining means and means for profile cutting, marking, or for bending and/or welding operations shall be collectively referred to as metal working means. Where referred to herein, a plate or other piece to be worked by a machining means shall be taken to include a workpiece of any suitable material that can be machined, such as wood, plastic, glass, fiber (including fiberglass) or metal, or a composite of the aforementioned materials. In a preferred form of the invention, the machining means may be a metal working means and the workpiece may be a metal piece.

Throughout the specification and claims, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically, but not exclusively, with the workpiece or plate lying in a horizontal plane.

It will be appreciated by those skilled in the art that many modifications and variations may be made to the methods of the invention described herein without departing from the spirit and scope of the invention.

What is claimed is:

1. An apparatus for working a substantially planar workpiece in relation to which a set of work actions is required to be performed at one of a number of work zones on or in said workpiece, said apparatus comprising:
    a working assembly for performing the working of the workpiece, said working assembly being movably mounted on a beam for reciprocal linear movement along a first axis in the form of a longitudinal axis of the beam; and
    an assembly rail movably mounted on said beam for movement along the first axis, said assembly rail having a second axis in the form of a longitudinal axis of the assembly rail, which second axis extends at a right angle to the first axis of said beam;
    wherein said apparatus further comprises:
        an immobilizing base mounted on said assembly rail for reciprocal linear movement along said assembly rail in the direction of the second axis;
        a clamping base mounted on said immobilizing base and adapted to be driven relative to the immobilizing base along a third axis perpendicular to the first and second axes so as to be clamped onto said workpiece to locate said working assembly at a predetermined one of said work zones; and
        a movable base mounted on said assembly rail for limited reciprocal linear displacement along said assembly rail in the direction of said second axis relative to said immobilizing base,
    wherein said working assembly is mounted on said movable base to enable limited linear displacement of said working assembly in said second axis direction in said predetermined work zone.

2. The apparatus according to claim 1, wherein said working assembly comprises a machining tool movably mounted to a tool rail for reciprocal linear movement along said tool rail in the direction of said first axis enabling, together with the displacement provided by the movable base, adjustments in position of the machining tool anywhere within said predetermined work zone.

3. The apparatus according to claim 2, wherein by the movement of said machining tool on said tool rail and by the displacement of said movable base on said assembly rail, said working assembly is serially locatable in a sequence of positions corresponding to said set of work actions in said predetermined work zone.

4. The apparatus according to claim 3, wherein said tool rail is mounted for controlled reciprocal movement toward and away from said workpiece to perform each said work action.

5. The apparatus according to claim 4, wherein said machining tool is a rotating tool capable of forming a series of recesses or holes in said workpiece that are greater in lateral size than the width of said rotating tool.

6. The apparatus according to claim 1, further comprising extendable actuators to press said clamping base against said workpiece to lock said workpiece in place.

7. The apparatus according to claim 1, wherein movement of said working assembly and said movable base in the direction of said second axis relative to said immobilizing base, as well as movement of said working assembly and said movable base together with said immobilizing base in the direction of said second axis, is driven by a common driver.

8. The apparatus according to claim 7, wherein said common driver is mounted to a driven support structure aligned such that a longitudinal axis of the driven support structure is parallel to said longitudinal axis of said assembly rail.

9. The apparatus according to claim 1, wherein said clamping base applies a clamping force to said workpiece that is larger than the greatest force that said working assembly will apply to said workpiece in performing said set of work actions.

10. A method of working a substantially planar workpiece in relation to which a set of work actions is required at one of a number of work zones on or in said substantially planar workpiece, said method comprising:
    clamping said substantially planar workpiece to said apparatus of claim 1 with said clamping base against movement of the workpiece during work carried out on the workpiece using said working assembly;
    moving said movable base independent of said immobilizing base to thus move said working assembly while said clamping base is activated and is applying said clamping force to said substantially planar workpiece.

* * * * *